(12) United States Patent
Van Oeveren et al.

(10) Patent No.: US 11,333,356 B2
(45) Date of Patent: May 17, 2022

(54) EDGE-BANDING APPARATUS AND METHOD

(71) Applicant: Hyfuse Limited, Nelson (NZ)

(72) Inventors: Henk Van Oeveren, Nelson (NZ); Johannes Pieter Van Oeveren, Nelson (NZ); Wilfried Manfred Turinsky, Nelson (NZ)

(73) Assignee: Hyfuse Limited

( * ) Notice: Subject to any disclaimer, the term of this patent is extended or adjusted under 35 U.S.C. 154(b) by 478 days.

(21) Appl. No.: 16/068,460

(22) PCT Filed: Jan. 13, 2017

(86) PCT No.: PCT/NZ2017/050001
§ 371 (c)(1),
(2) Date: Jul. 6, 2018

(87) PCT Pub. No.: WO2017/123101
PCT Pub. Date: Jul. 20, 2017

(65) Prior Publication Data
US 2019/0017702 A1    Jan. 17, 2019

(30) Foreign Application Priority Data

Jan. 15, 2016  (NZ) .................................... 716085
Apr. 15, 2016  (NZ) .................................... 719093

(51) Int. Cl.
| | |
|---|---|
| *F23N 5/00* | (2006.01) |
| *B27D 5/00* | (2006.01) |
| *B29C 65/10* | (2006.01) |
| *B29C 65/00* | (2006.01) |
| *B29C 63/00* | (2006.01) |

(Continued)

(52) U.S. Cl.
CPC ............. *F23N 5/006* (2013.01); *B27D 5/003* (2013.01); *B29C 63/0026* (2013.01); *B29C 63/0065* (2013.01); *B29C 65/106* (2013.01); *B29C 66/112* (2013.01); *B29C 66/114* (2013.01); *B29C 66/472* (2013.01); *B29C 66/7487* (2013.01); *B29C 66/83411* (2013.01); *B29C 66/9161* (2013.01); *F23N 1/022* (2013.01); *F23N 5/00* (2013.01); *B29C 66/9141* (2013.01); *B29C 66/934* (2013.01); *B29L 2031/44* (2013.01)

(58) Field of Classification Search
USPC ........................................................ 431/76
See application file for complete search history.

(56) References Cited

U.S. PATENT DOCUMENTS

| | | | |
|---|---|---|---|
| 4,409,060 A | * | 10/1983 | Janssens ................ B27D 5/003 156/497 |
| 4,747,903 A | | 5/1988 | Miller |
| 6,139,481 A | | 10/2000 | Norwood |

(Continued)

FOREIGN PATENT DOCUMENTS

JP    S60-048331    3/1985

*Primary Examiner* — Steven B McAllister
*Assistant Examiner* — John E Bargero
(74) *Attorney, Agent, or Firm* — Botkin & Hall, LLP

(57) ABSTRACT

An edge-banding apparatus is provided and configured to apply an edging strip having a heat activated layer to a substrate or work piece. The apparatus uses localized heat generated from a controlled flame from combustible fuel to apply heat to the edging strip to active the heat activated layer.

22 Claims, 2 Drawing Sheets

Figure 1:
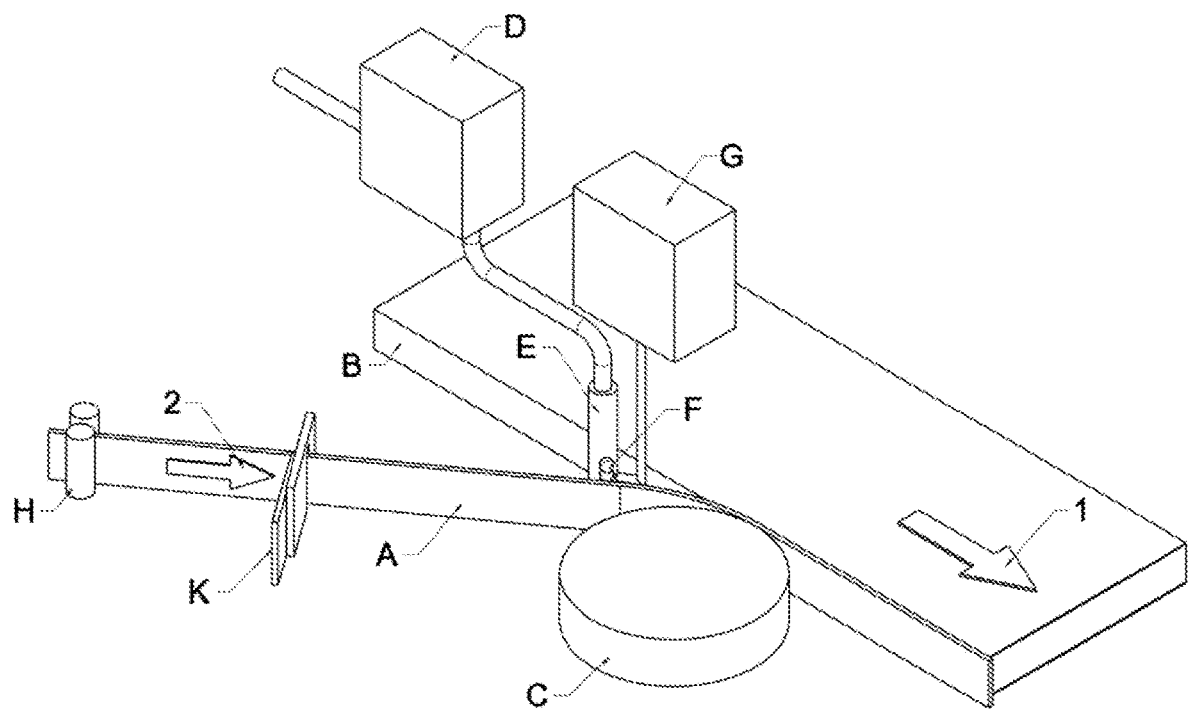

(51) Int. Cl.
*F23N 1/02* (2006.01)
*B29L 31/44* (2006.01)

(56) References Cited

U.S. PATENT DOCUMENTS

2011/0111184 A1\* 5/2011 Bytensky ............. A47B 13/083
428/192
2014/0014266 A1 1/2014 Schulte-Goebel \* cited by examiner

EDGE-BANDING APPARATUS AND METHOD

CROSS REFERENCE TO RELATED APPLICATIONS

This is the U.S. National Stage of International Application No. PCT/NZ2017/05001 filed on Jan. 13, 2017, which was published in English under PCT Article 21(2), which in turn claims the benefit of New Zealand Patent Nos. 716,085 filed on Jan. 15, 2016 and 719,093 filed on Apr. 15, 2016, all of which are incorporated herein by reference in their entirety.

FIELD OF THE INVENTION

This invention relates to an edge-banding apparatus and a method of applying an edging strip to a substrate or workpiece. In one example, the invention relates to an edge-banding apparatus and method for the application of plastic tape to furniture components.

BACKGROUND

In order to cover the edges of a substrate or work piece, such as particle board or MDF panels for example, such as those used for kitchens and furniture, an edging strip, such as a plastic or wood veneer, is commonly applied to these edges. Machines for this purpose are called edge-banders and a relatively wide range is available. The adhesion of the edging strip is traditionally achieved by applying hot melt glue to the edge of the panel or the strip and subsequent pressing of the strip against the panel until the glue has cooled down.

More recently apparatus have come onto the market that use a plastic edge with an adhesive layer that can be activated by applying heat ("active layer"). This layer can be coextruded during manufacture of the edging strip, or can be applied separately. In these apparatus the strip is applied by heating the "active layer" and subsequent pressing the strip against the edge of the panel.

Heat can be applied by a variety of means such as Laser, Plasma, Infrared radiation and compressed hot air. Patent EP1445082 B1 discloses an apparatus for applying heat using compressed hot air. The relatively high feed speeds of these machines in combination with the need for very precise heating of the active layer with only minimal heating of the actual edging strip can make the methods above expensive and/or difficult to control. The use of compressed hot air as described in EP1445082 B1 can be difficult to control. The separation of the heat source from the actual application area, the required high temperatures of the air (typically around 500° C.) and the thermal capacity of the heating nozzle from which the hot air is expelled, lead to substantial heat losses and temperature variations in the heating nozzle. These temperature variations can lead to the overheating of sections of the edging strip while leaving other sections insufficiently hot. Such systems can require that some flow of hot gas is maintained to maintain the temperature of the nozzle even when no edging strip is being applied. In other words, the gas has to be continuously heated and delivered via the heating nozzle, even when the apparatus is not in use, to avoid or minimise certain parts of the gas delivery tube and nozzle from overcooling leading to inconsistent heating of the heat activated layer. The energy, and computing power required for such an apparatus can be undesirable high, and lead to relatively high running costs, as well as relatively high apparatus purchase costs.

It can be desirable to use an edging strip as above, with a heat activated adhesive 'active' layer, because the adhesive layer is desirably relatively thin, perhaps 0.2 mm for example, the thickness of the adhesive along different parts of the strip can be controlled relatively well, and the adhesive can be made in the same or a similar colour to the strip itself, thus minimising any visual impact of the adhesive once the strip has been applied to the substrate.

OBJECT OF THE INVENTION

It is therefore an object of the invention to provide an edge banding apparatus and method which overcome or at least ameliorate one or more disadvantages of the prior art, or alternatively to at least provide the public with a useful choice.

Further objects of the invention will become apparent from the following description.

SUMMARY OF INVENTION

Accordingly in one aspect the invention may broadly be said to consist in an edge-banding apparatus configured to apply an edging strip having a heat activated layer to a substrate or work piece, the apparatus comprising:
  a. an edging strip feeding device to feed the edging strip along a predetermined path towards the substrate or work piece;
  b. the apparatus being configured to comprise, or be in fluid communication with, a source of combustible fuel;
  c. the apparatus further comprising a fuel delivery device in fluid communication with the source of combustible fuel such that combustible fuel can be delivered to the fuel delivery device;
  d. the apparatus further comprising an ignition device configured to ignite the combustible fuel at or near the fuel delivery device such that a controlled flame is generated by the fuel delivery device;
  e. the apparatus further comprising one or more controllers configured to control one or more properties of the controlled flame of combustible fuel such that the heat from the flame activates the heat activated layer of the edging strip such that the edging strip is applied to the substrate or work piece.

The properties of the flame of combustible fuel that may be controlled may include any one or more of:
  f. synchronisation of the timing of generation of the flame with respect to the position of the edging strip and/or the substrate or work-piece;
  g. size of the flame;
  h. temperature of the flame;
  i. duration of the flame;
  j. timing of ignition of the combustible fuel to generate the flame;
  k. timing of extinguishing of the flame.

A fuel flow controller may be configured to control the flow rate of combustible fuel through the fuel delivery apparatus.

The combustible fuel may include one or more of hydrogen and oxygen. The source of combustible fuel may comprise at least one of:
  l. A storage tank, which may be pressurised, in which the combustible fuel is stored; and/or m. A combustible fuel generator configured to generate the combustible fuel for example by a chemical reaction, preferably electrolysis.

The apparatus may further comprise a substrate driving device to drive the substrate or work piece along a predetermined path. The substrate driving means may drive the substrate or work piece at a speed in the range of 12-20 m/min.

The fuel delivery apparatus preferably comprises a burner comprising a plurality of fuel delivery apertures. An aperture control device may be provided and configured such that the number of fuel delivery apertures that are active, that is, which are configured to deliver combustible fuel at a given time, can be varied. The aperture control device may comprise one or more pistons inside the fuel delivery apparatus. The fuel delivery apertures may be spaced apart across a distance which corresponds to the width of the edging strip.

The edging strip, when aligned with the fuel delivery nozzle, may be spaced between 1 and 5 mm from the fuel delivery nozzle, and preferably 2.5 mm.

A primary direction of the flame may be inclined with respect to the longitudinal axis of the edging strip, at a position when the edging strip is aligned with the fuel delivery apparatus.

A substrate or work piece position sensor may be provided, configured to detect the position of the substrate or work piece, the output from the sensor being used by the one or more controllers to control one or more of the:

n. Start of the flow of combustible fuel to the fuel delivery apparatus;
o. Ignition of the combustible fuel;
p. Duration of the flame;
q. Termination or extinguishing of the flame;
r. Termination of the flow of combustible fuel to the fuel delivery apparatus.

The sensor may detect one or more of:

s. A forward end of the substrate or work piece;
t. A rear end of the substrate or work piece.

The one or more controllers may be configured to terminate the flow of combustible fuel to the fuel delivery apparatus a predetermined time prior to termination of the ignition device, the predetermined time preferably being around 0.5 s.

The one or more controllers may be configured to control the speed of the substrate or work piece in conjunction with the pressure and/or flow rate of the combustible fuel.

The fuel delivery device may comprise a manifold or pre-chamber in which the combustible fuel is mixed prior to ignition.

An edging strip speed monitoring device may be provided and configured to monitor the speed of the edging strip as it passes the fuel delivery device. The output from the edging strip speed monitoring device may be used by the one or more controllers to deactivate the fuel delivery device if:

u. the speed of the edging strip drops; and/or
v. the edging strip stops moving.

The apparatus may be configured to comprise or be connected to a source of inert fuel, the one or more controllers controlling delivery of the inert fuel to extinguish any unwanted flame at or near the fuel delivery device.

A power isolator may be provided and configured to, when activated, instantaneously isolate power to the apparatus or parts of the apparatus.

A combustible fuel safety valve may be provided in the fuel flow path between the source of fuel and the fuel delivery device.

The combustible fuel may comprise a mixture of more than one fuel, preferably a mixture of equal quantities of each of the fuels.

The flow rate of fuel delivered to the fuel delivery device may be controlled by regulating the pressure at which fuel flows through an orifice in the fuel delivery path.

According to another aspect of the invention there is provided a method of applying an edging strip having a heat activated layer to a substrate or work piece, comprising steps of:

w. feeding an edging strip along a predetermined path towards the substrate or work piece;
x. delivering combustible fuel from a combustible fuel source to a fuel delivery device;
y. igniting the combustible fuel using an ignition device at or near the fuel delivery device such that a controlled flame is generated by the fuel delivery device;
z. controlling one or more properties of the controlled flame of combustible fuel such that the heat from the flame activates the heat activated layer of the edging strip such that the edging strip is applied to the substrate or work piece.

In one aspect an edge banding apparatus provides direct, precisely controlled application of heat to a predetermined area of a heat activated layer of an edging strip, using a controlled flame periodically generated when required from one or more combustible fuels.

In another aspect. the invention relates to a method of applying plastic strips with a heat activatable layer to MDF and particle board panels where the heat required for activating the said layer is supplied by a direct flame generated from the combustion of a combustible fuel, fuel mixture or liquid.

In some examples, the combustible fuel may be a combustible gas. In other examples the combustible fuel may be a solid or liquid fuel for example.

In a further aspect of the invention there is provided a method of applying a plastic strip with a heat activatable adhesive layer to edges of wooden panels by heating the activatable layer directly with a controllable flame.

Further aspects of the invention, which should be considered in all its novel aspects, will become apparent from the following description.

DRAWING DESCRIPTION

Figure 2:
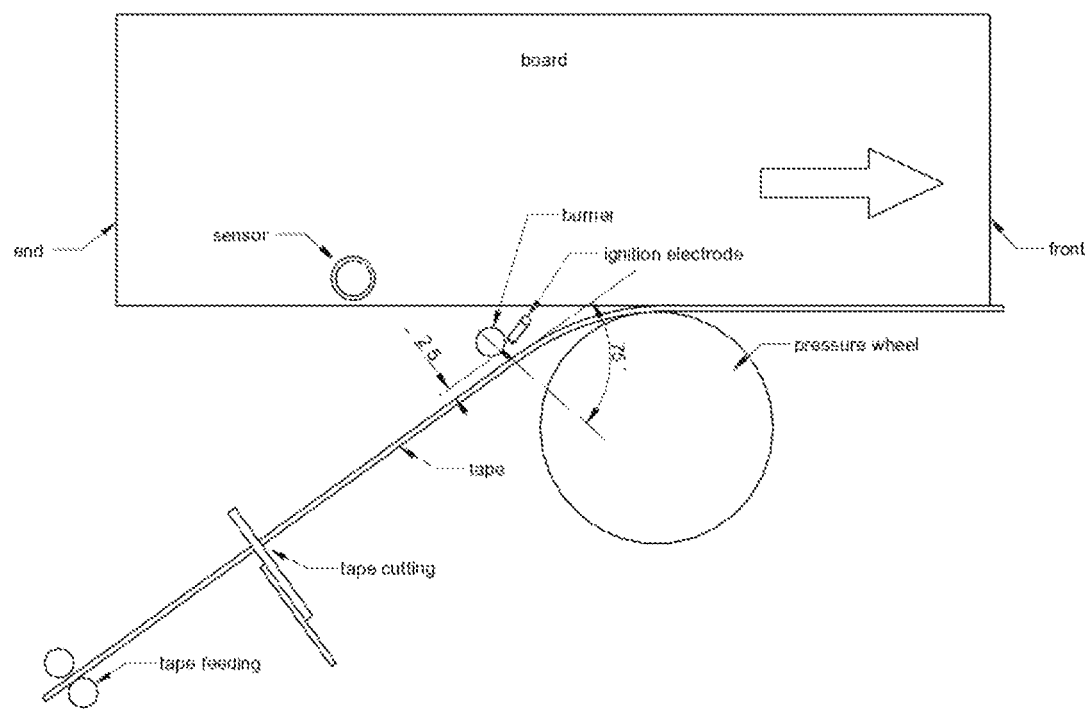

A number of embodiments of the invention will now be described by way of example with reference to the drawings in which:

FIG. 1 is a schematic perspective view of an edge-banding apparatus in accordance with the invention; and FIG. 2 is a schematic plan view of the edge-banding apparatus of FIG. 1.

DETAILED DESCRIPTION OF THE DRAWINGS

Throughout the description like reference numerals will be used to refer to like features in different embodiments.

An edge-banding apparatus is configured to apply an edging strip having a heat activated layer to a substrate or work piece. The apparatus primarily comprises a. an edging strip feeding device to feed the edging strip along a predetermined path towards the substrate or work piece;
b. the apparatus being configured to comprise, or be in fluid communication with, a source of combustible fuel such as one or more combustible gases;

c. the apparatus further comprising a fuel delivery conduit and a fuel delivery device, the fuel delivery conduit being in fluid communication between the source of combustible fuel and the fuel delivery device such that combustible fuel can be delivered to the fuel delivery device;
d. the apparatus further comprising an ignition device configured to ignite the combustible fuel at or near the fuel delivery device such that a controlled flame is generated;
e. the apparatus further comprising one or more controllers configured to control one or more properties of the controlled flame of combustible fuel such that the heat from the flame activates the heat activated layer of the edging strip such that the edging strip is applied to the substrate or work piece.

The further description below refers, for clarity, to the combustible fuel being a combustible gas. By 'fuel' we include a single fuel or any mixture of one or more fuels, such as a mixture of one or more gases for example.

The flame that is generated is controlled to apply a desired amount of heat to a predetermined area of the heat activated layer of the edging strip sufficient to activate the adhesive in the heat activated layer just prior to the heat activated layer being pressed into contact with the edge of the substrate or work piece. The flame provides a precisely controllable amount of heat that is applied to the edging strip. The properties of the flame of combustible gas that are controlled included any one or more of:
a. synchronisation of the timing of generation of the flame with respect to the position of the edging strip and/or the substrate or work-piece;
b. size of the flame;
c. temperature of the flame;
d. duration of the flame
e. timing of ignition of the combustible gas to generate the flame
f. timing of extinguishing of the flame.

The flame generated using such an apparatus may effectively be instantaneously controlled in terms of when the flame is generated, extinguished, and the amount of heat that the flame generates.

The apparatus may further comprise other edge-banding machine features such as a cutting device to cut the edging strip at the correct length, a pressure wheel or roller to squeeze the edging strip between the pressure wheel and the substrate or work piece once heat has been applied to the heat activated layer, and a substrate driving device to drive the substrate or work piece along a predetermined path in synchronisation with the edging strip.

Referring first to FIG. 1, common to an edge-bander is that a panel with edge (B) is mechanically moved as per arrow (1). A strip feeding device (H) feeds a plastic strip with a heat activatable layer (A) as per arrow (2). The movement of the panel and plastic strip are synchronised.

A gas control device (D) starts a flow of a controlled amount of combustible gas mixture, for example Hydrogen and Oxygen, to a burner (E) which has one or more holes pointing towards the heat activatable layer of plastic strip (A) just prior to the plastic strip (A) reaching burner (E).

Ignition device (G) immediately ignites the said gas resulting in flame (F). The plastic strip (A) moves past burner (E) where the heat activatable layer comes in direct contact with flame (F), heating/activating the said layer.

The plastic strip gets subsequently pressed against edge (B) by pressure wheel (C). The short time interval in which each individual point on plastic strip (A) is in contact with the flame (F) (typically less than 20 msec) as well as the short time interval between contact of plastic strip (A) with the flame and the pressing of plastic strip (A) against the edge of panel (B) (typically less than 250 msec) make any burning of the heat activatable layer insignificant.

Cutting device (K) cuts plastic strip (A) to the required length. As soon as the end of plastic strip (A) moves past burner (B) the gas control device stops the flow of combustible gas and the flame extinguishes. The system is immediately ready for a subsequent panel.

In one example, the required gas mixture is produced in direct connection with the apparatus by for example electrolysis of water, or taken from a pressurised storage.

Because the heat is generated directly in front of the active layer there are no heat losses from a tube system nor are there any heating delays, it also makes it possible to achieve much higher temperatures than with ducted hot air for example.

Other preferable features of the apparatus and method include, but are not limited to
Speed: 12-20 m/min.
Burner with row of 0.5 mm holes with 2 mm spacing over the width of the edging strip, that is, the vertical height of the edging strip with reference to the orientation shown in the figures.
Edging strip travels 2.5 mm away from the gas delivery device or burner.
Angle between direction of the flame and edging strip is around 75° facing downstream when the apparatus is viewed in plan as per FIG. 2.
Preferable control features include any one or more of:
Sensor positioned 100 mm upstream of the burner that detects the front and end of the substrate.
The detection of the front of the substrate is used to start the flow of hydrogen and oxygen as well as the ignition.
Timers are used to allow for precise heat application depending on the track speed.
The detection of the end of the substrate is used to stop the burner. When stopping the burner it is essential to stop the hydrogen flow 0.5 of a second first to avoid flashback of the flame into the burner.
Further possible alternative or optional features may include any one or more of:
The apparatus may be simplified by not using gas generators and instead using hydrogen and oxygen bottles.
Other suitable gases can be used other than hydrogen and oxygen.
A signal from a board sensor can also come from line control of the edge-bander.
The following features may also be considered non-essential but may be useful:
A metal piston inside the burner can be used to vary the number of open outlets to suit different edging strip widths.
Automatic link between track speed and gas pressure to allow variable speed processing which is used for edge banding of stationary panels (contour edging)
Any one or more of the following safety features may be included:
Mixing of the hydrogen and oxygen has to take place in a metal chamber that is part of the burner.
The chamber has to be metal to withstand accidental flashback.
It may be important, and a regulatory requirement in some territories, that the feed of tape passing the burner is monitored and that the burner is turned off instantly as soon the tape slows down or stops completely.

For extra safety measures the gas is replaced by an inert gas to instantly extinguish any burning tape.

A safety contactor will isolate the power to the gas generator and/or safety valve Any one or more of the following features relating to flame size/control/ignition may be included:

In some examples, the gas mixture is not stoichiometric but closer to equal quantities of each gas. Other types of mixture may be used as appropriate. The heat generated from the combustion process would typically be greatest when the mixture is stoichiometric. Our testing seems to indicate that a mixture richer with oxygen may be more efficient. This might be caused by some hydrogen escaping because of the high nitrogen content of air and that an oversupply of oxygen mitigates this. It is also possible that the extra oxygen helps burn evaporated plastic from the edging strip, adding to the heat.

In other examples, the gas mixture may be closer to stoichiometric than to equal quantities of each gas.

Gas quantities may be controlled using fixed delivery orifices by adjusting the pressure at which the gas flows through each fixed orifice. For track speeds from 12-20 m/min a 300 micron orifice can be used for Hydrogen and 600 micron for oxygen, while the pressure can be variable between 25 and 60 kPa for both gases.

The gas mixture may alternatively or additionally be controlled using variable gas delivery orifices the flow through each of which is controlled using respective mechanically linked needle valves while keeping the gas supply pressures substantially constant. The supply pressure of each gas can be set somewhere between 0.5 and 1 bar depending on the track speed of the machine.

In one example, when 20 mm wide edging tape is processed at 20 m/min, the flowrate of combustible gas is about three L/min of oxygen and five L/min of hydrogen. The apparatus may use a directly proportional relationship with the speed and the width of the edging tape, which effectively means that the amount of fuel required to apply an area of tape is constant.

Pressure of both gases should preferably be identical. It is preferable that the ignition electrode is positioned in close proximity of the gas outlets of the burner so the spark is between the electrode and the burner. The electrode can be placed beside the outlet in order not to interfere with the tape.

The solenoid valve that starts and stops the gas flow needs to be preferably placed within 300 mm of the burner in order to achieve a precise timing of the starting and stopping of the flame.

From the foregoing it will be seen that an edge banding apparatus and method are provided which may provide direct, precisely controlled application of heat to a predetermined area of a heat activated layer of an edging strip, using a controlled flame periodically generated when required from combustible fuel such as one or more combustible gases.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. An edge-banding apparatus configured to apply an edging strip having a heat activated layer to a substrate or work piece, the apparatus comprising:
   a. an edging strip feeding device to feed the edging strip along a predetermined path towards the substrate or work piece;
   b. the apparatus being configured to comprise, or be in fluid communication with, a source of combustible fuel;
   c. the apparatus further comprising a fuel delivery device in fluid communication with the source of combustible fuel such that combustible fuel can be delivered to the fuel delivery device;
   d. the apparatus further comprising an ignition device configured to ignite the combustible fuel at or near the fuel delivery device such that a controlled flame is generated by the fuel delivery device;
   e. the apparatus further comprising one or more controllers configured to control one or more properties of the controlled flame of combustible fuel such that the flame directly contacts and activates the heat activated layer of the edging strip no more 250 milliseconds prior to the heat activated layer being pressed into contact with an edge of substrate or work piece such that the edging strip is applied to the substrate or work piece; and
   wherein the fuel delivery device, when aligned with the edging strip, is spaced between 1 and 5 mm from the edging strip.

2. The apparatus of claim 1 wherein the properties of the flame of combustible fuel that are controlled included any one or more of:
   a. synchronization of the timing of generation of the flame with respect to the position of the edging strip and/or the substrate or work-piece;
   b. size of the flame;
   c. temperature of the flame;
   d. duration of the flame;
   e. timing of ignition of the combustible fuel to generate the flame;
   f. timing of extinguishing of the flame.

3. The apparatus of claim 1 further comprising a fuel flow controller configured to control the flow rate of combustible fuel through the fuel delivery device.

4. The apparatus of claim 1 wherein the combustible fuel includes one or more of hydrogen and oxygen and another gas.

5. The apparatus of claim 1 further comprising a substrate driving device to drive the substrate or work piece along a predetermined path.

6. The apparatus of claim 1 wherein the fuel delivery device comprises a burner comprising a plurality of fuel delivery apertures.

7. The apparatus of claim 6 further comprising an aperture control device configured such that the number of fuel delivery apertures that are active, that is, which are configured to deliver combustible fuel at a given time, can be varied;

Wherein the aperture control device comprises one or more pistons inside the fuel delivery device; and Wherein the fuel delivery apertures are spaced apart from a distance which corresponds to the width of the edging strip.

8. The apparatus of claim 1 wherein the edging strip, when aligned with the fuel delivery nozzle, is spaced 2.5 mm from the fuel delivery nozzle.

9. The apparatus of claim 1 wherein a primary direction of the flame is inclined with respect to the longitudinal axis of the edging strip, at a position when the edging strip is aligned with the fuel delivery device.

10. The apparatus of claim 1 further comprising a substrate or work piece position sensor, configured to detect the position of the substrate or work piece, the output from the substrate or work piece position sensor being used by the one or more controllers to control one or more of the:

a. Start of the flow of combustible fuel to the fuel delivery device;
b. Ignition of the combustible fuel;
c. Duration of the flame;
d. Termination or extinguishing of the flame;
e. Termination of the flow of combustible fuel to the fuel delivery device; and Wherein the substrate or work piece position sensor detects one or more of:

a. A forward end of the substrate or work piece;
b. A rear end of the substrate or work piece.

11. The apparatus of claim 1 wherein the one or more controllers are configured to control the speed of the substrate or work piece in conjunction with the pressure and/or flow rate of the combustible fuel.

12. The apparatus of claim 1 wherein the fuel delivery device comprising a manifold or pre-chamber in which the combustible fuel is mixed prior to ignition.

13. The apparatus of claim 1 comprising an edging strip speed monitoring device configured to monitor the speed of the edging strip as it passes the fuel delivery device; and wherein the output from the edging strip speed monitoring device is used by the one or more controllers to deactivate the fuel delivery device if:

a. The speed of the edging strip drops; and/or
b. The edging strip stops moving.

14. The apparatus of claim 1 configured to comprise or be connected to a source of inert gas, the one or more controllers controlling delivery of the inert gas to extinguish any unwanted flame at or near the fuel delivery device.

15. The apparatus of claim 1 wherein the combustible fuel comprises a mixture of more than one fuel.

16. The apparatus of claim 15 wherein the combustible fuel comprises a mixture of equal quantities of each of the fuels.

17. The apparatus of claim 1 wherein the flow rate of fuel delivered to the fuel delivery device is controlled by regulating the pressure at which fuel flows through an orifice in the fuel delivery path.

18. The apparatus of claim 1 wherein the combustible fuel is a combustible gas.

19. A method of applying an edging strip having a heat activated layer to a substrate or work piece, comprising steps of:

a. feeding an edging strip along a predetermined path towards the substrate or work piece;
b. delivering combustible fuel from a combustible fuel source to a fuel delivery device;
c. igniting the combustible fuel using an ignition device at or near the fuel delivery device such that a controlled flame is generated by the fuel delivery device; and
d. controlling one or more properties of the controlled flame of combustible fuel such that the flame directly contacts and activates the heat activated layer of the edging strip no more than 250 milliseconds prior to the heat activated layer being pressed into contact with an edge of the substrate or work piece such that the edging strip is applied to the substrate or work piece; and wherein the fuel delivery device, when aligned with the edging strip, is spaced between 1 and 5 mm from the edging stip.

20. A panel to which an edging strip has been applied, produced by the apparatus of claim 1.

21. The apparatus of claim 1, wherein combustion of the combustible fuel is occurring where the flame meets the heat activated layer.

22. The method of claim 19, when the flame directly contacts and activates the heat activated layer, combustion of the combustible fuel is occurring.

* * * * *